United States Patent
Shen et al.

(10) Patent No.: US 10,260,960 B2
(45) Date of Patent: Apr. 16, 2019

(54) SYSTEM AND METHOD TO MITIGATE ABRUPT ENVIRONMENT TEMPERATURE DISTURBANCES IN COLD JUNCTION OF TC/RTD IN CONTROL SYSTEMS

(71) Applicant: Honeywell International Inc., Morris Plains, NJ (US)

(72) Inventors: Jun Shen, Shanghai (CN); Qibin Liu, Shanghai (CN); Guokun Song, Shanghai (CN); Tony Zhang, Shanghai (CN); Aaron Shen, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 526 days.

(21) Appl. No.: 14/972,570

(22) Filed: Dec. 17, 2015

(65) Prior Publication Data
US 2017/0176259 A1   Jun. 22, 2017

(51) Int. Cl.
*G01K 7/00* (2006.01)
*G01K 1/00* (2006.01)
*G01K 7/13* (2006.01)
*G01K 1/20* (2006.01)

(52) U.S. Cl.
CPC .................... *G01K 7/13* (2013.01); *G01K 1/20* (2013.01)

(58) Field of Classification Search
USPC .............. 374/181, 1, 142, 179, 183
See application file for complete search history.

(56) References Cited

U.S. PATENT DOCUMENTS

| | | | |
|---|---|---|---|
| 4,120,201 A | 10/1978 | Wargo | |
| 4,623,266 A | 11/1986 | Kielb | |
| 4,804,272 A * | 2/1989 | Schmitz | G01K 7/12 136/230 |
| 4,936,690 A | 6/1990 | Goetzinger | |
| 5,167,519 A | 12/1992 | Jones et al. | |
| 5,340,216 A * | 8/1994 | Goldschmidt | G01K 7/12 374/182 |
| 5,484,206 A | 1/1996 | Houldsworth | |
| 2004/0058588 A1 * | 3/2004 | Demeocq | G01K 7/023 439/894 |
| 2004/0255998 A1 * | 12/2004 | Schuh | G01K 7/13 136/224 |
| 2005/0047479 A1 | 3/2005 | Underwood | |
| 2008/0025372 A1 * | 1/2008 | Culbertson | G01K 1/08 374/185 |

* cited by examiner

*Primary Examiner* — Mirellys Jagan (57) ABSTRACT

A method and system for calculating a cold junction temperature comprises an offline phase comprising: determining an applicable algorithm for calculating a cold junction screw temperature, and deploying the applicable algorithm in firmware; and an online phase comprising: providing at least one measured temperature to the applicable algorithm deployed in firmware, calculating a temperature of a cold junction screw according to the applicable algorithm deployed in firmware, and assigning the calculated temperature of the cold junction screw as a cold junction temperature.

7 Claims, 7 Drawing Sheets

SYSTEM AND METHOD TO MITIGATE ABRUPT ENVIRONMENT TEMPERATURE DISTURBANCES IN COLD JUNCTION OF TC/RTD IN CONTROL SYSTEMS

TECHNICAL FIELD

Embodiments are generally related to the field of control systems. Embodiments are also related to the field of thermocouples. Embodiments are further related to the field of resistance temperature detectors. Embodiments are related to methods and systems for determining temperature at a cold junction in TC/RTD control systems.

BACKGROUND

For industry control systems, temperature inputs are often acquired by thermocouples (TC) in resistance temperature detector (RTD) sensors. TC's connections to RTDs require cold junction compensation. Specifically, TCs/RTDs on a printed circuit board (PCB) use a cold junction for temperature compensation. The temperature detected by the sensor on the PCB is often regarded as the cold junction temperature.

However, abrupt environmental temperature disturbances (i.e. wind, exposure to heated wires or other PCB elements, exposure to the environment outside the control system cabinet, etc.), cause a difference between the on PCB sensor detected temperature and the temperature of the screw actually causing electric potential difference. This is a result of the varying thermodynamic properties of such elements (i.e. thermo capacity, thermo conductivity, etc.). This difference exists for a period of time even after the environmental temperature disturbance disappears. During this period, the control system temperature measurements may not be accurate and the control system performance may deteriorate as a result.

Currently, the solution to this problem is to physically add an environmental closure by wrapping the PCB temperature sensor and the screws of the TC/RTD cold junction, in order to insulate it from the external environment. This can effectively mitigate the temperature disturbance problem in some cases. However, it is also expensive and not fully robust to varying external and/or internal conditions. Accordingly, a need exists for methods and systems that mitigate environmental temperature disturbances in the TC/RTD cold junction used in control systems.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for determining temperature.

It is another aspect of the disclosed embodiments to provide a method and system for estimating the actual temperature.

It is yet another aspect of the disclosed embodiments to provide an enhanced method and system for determining the actual temperature on screws of TC/RTD cold junctions in order to provide accurate temperature readings in control systems.

The aforementioned aspects and other objectives and advantages can now be achieved as described herein. A method and system for calculating a cold junction temperature comprises an offline phase comprising: determining an applicable algorithm for calculating a cold junction screw temperature; and deploying the applicable algorithm in firmware; and an online phase comprising: providing at least one measured temperature to the applicable algorithm deployed in firmware; calculating a temperature of a cold junction screw according to the applicable algorithm deployed in firmware; and assigning the calculated temperature of the cold junction screw as a cold junction temperature.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
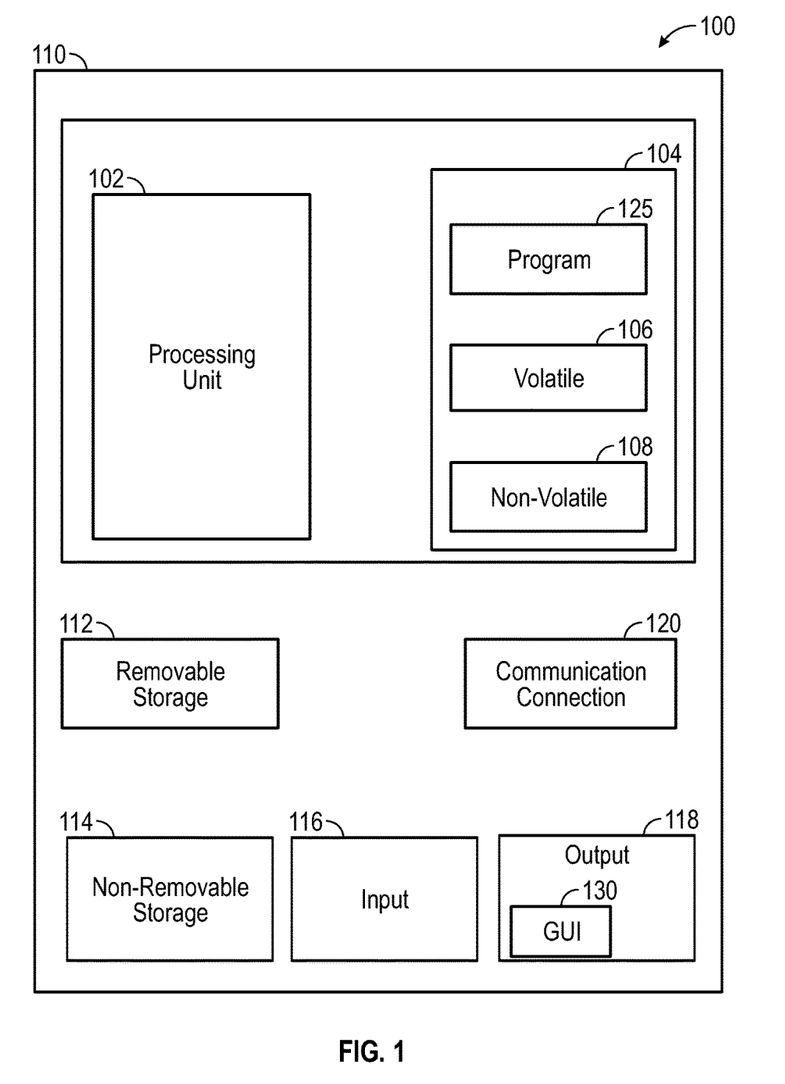
FIG. 1 depicts a block diagram of a computer system which is implemented in accordance with the disclosed embodiments.
Figure 2:
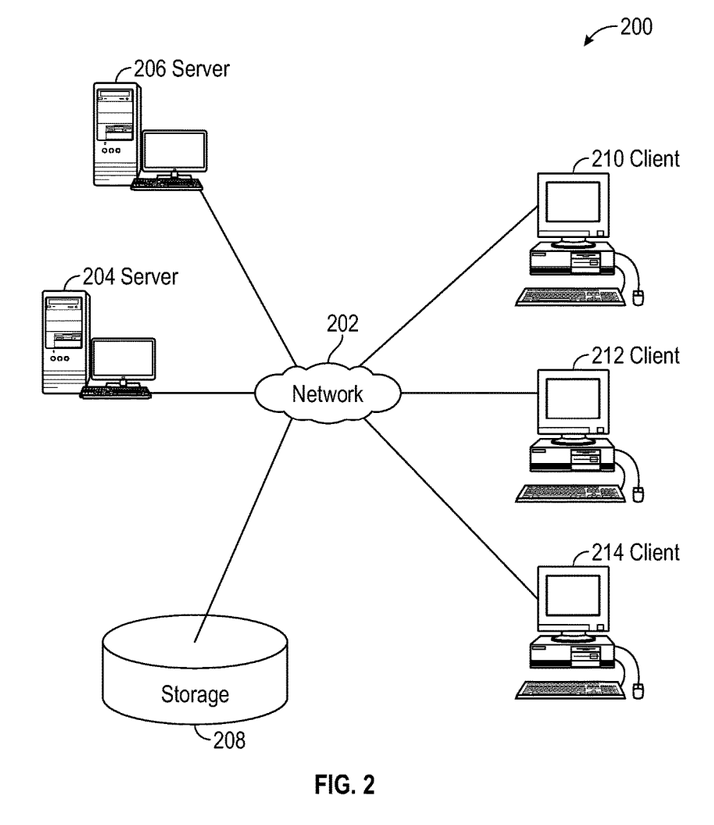
FIG. 2 depicts a graphical representation of a network of data-processing devices in accordance with the disclosed embodiments.
Figure 3:
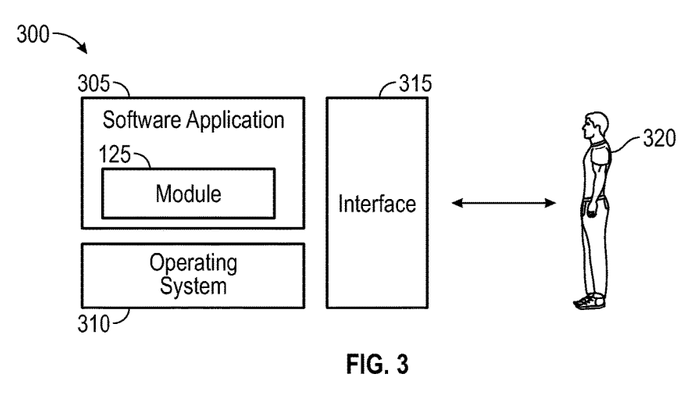
FIG. 3 depicts a computer software system for directing the operation of the data-processing system depicted in FIG. 1, in accordance with the disclosed embodiments.

FIGS. 1-3 are provided as exemplary diagrams of data-processing environments in which aspects of the embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, control systems, mobile devices, mobile phones, Smartphones, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as control systems, mobile phones, smartphones, tablet devices, and the like in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more servers 204 and 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 204 and 206, one or more external devices such as control systems, mobile devices, and/or a memory storage unit such as, for example, memory or database 208.

In the depicted example, servers 204 and 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, control systems, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices multi-processor systems, printers, copiers, fax machines, multi-function devices, data networks, microprocessor-based or programmable consumer electronics, networked personal computers, minicomputers, mainframe computers, servers, control systems and the like.

Note that the term module or node as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface) can serve to display results, whereupon a user 320 may supply additional inputs or terminate a particular session. In some embodiments, operating system 310 and GUI 315 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to certain aspects of embodiments of the present invention, which can be embodied in the context of or require the use of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

Thermocouples are one known temperature measurement device used in control systems. Thermocouples are advantageous because they have a relatively low price, a wide temperature range, are passive, and are generally considered durable. Thermocouples do not offer superior accuracy. However, thermocouples are often still used because of their low cost and versatility. Of particular note in some applications is that thermocouples are passive and generate voltage without any additional active circuitry. Thermocouples require a stable voltage reference and some form of cold junction compensation.

Figure 4:
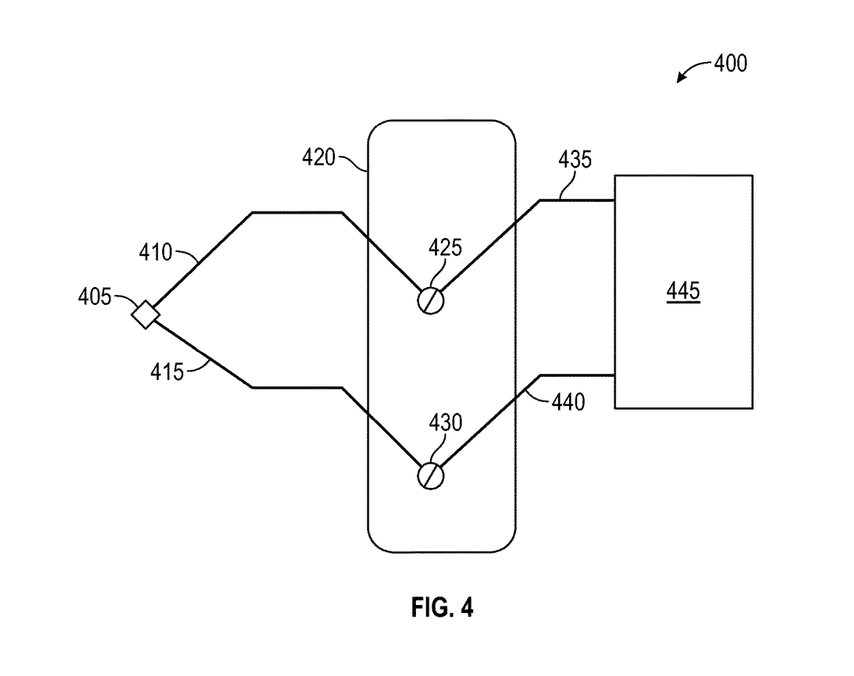
FIG. 4 depicts a block diagram of a thermocouple in accordance with the disclosed embodiments.

A thermocouple 400 is illustrated in FIG. 4. A thermocouple generally includes at least two wires 410 and 415 made from two dissimilar conductors (usually alloys). The composition of the wires 410 and 415 can vary depending on the application and its required temperature range, accuracy required, life span, and environmental conditions. The ends of the wires 410 and 415 are connected at one end 405.

Thermocouple 400 operates according to the thermoelectric or Seebeck effect. The thermoelectric effect describes a phenomenon wherein a conductor that experiences a temperature gradient from one end of the conductor to the other develops a potential difference. Different metals exhibit the thermoelectric effect at different intensities.

Thermocouples take advantage of the thermoelectric effect. Specifically wires 410 and 415 are connected at point 405. The differences in voltage at points 425 and 430 are thus proportional to the temperature gradient formed from either end of the pair of wires 410 and 415.

It is important to note that, as a result, thermocouple 400 does not actually measure temperature; instead thermocouple 400 takes advantage of the difference in temperature between screws 425 and 430 in order to determine temperature. The area where points 425 and 430 respectively connect to wire 435 and 440 which are formed from a third metal (usually copper) is known as the cold junction 420. In this case, the cold junction is illustrated between a thermocouple and RTD 445. In order to measure temperature using a thermocouple the temperature of the cold junction 420 or the point 405 must be known.

The temperature of junction (or screw) 425 between wires 410 and 435, and junction (or screw) 430 between wires 415 and 440 can be monitored in order to calculate the temperature at junction 405. Junctions 405, 425, and 430 may connect to traces used in RTDs, such as RTD 445 on a printed circuit board (PCB). It should be noted that junctions 425 and 430 can be treated as a single reference junction according to the law of intermediate metals, provided that they are kept very close to isothermal.

When the thermocouple is deployed, the temperature of cold junction 420 can be collected. Using this temperature, the absolute temperature at 405 can be calculated. This is known as cold junction compensation. The temperature of cold junction 420 can be measured using any number of known temperature measuring devices.

However, as previously noted, in prior art methods the cold junction 420 was required to remain isothermal or be held at the same temperature using insulating wraps. Alternatively, isothermal blocks are used to keep the junctions at the same temperature.

Resistance temperature detectors (RTDs) represent another means of measuring temperature. RTDs operate on the principle that there is a correlation between the resistance in pure metals and temperature characterized by a linear positive change in resistance as temperature increases.

Pure metals that can be used for the RTDs disclosed herein can include nickel copper, and platinum, but other metals may be used depending on design considerations. Platinum is preferable because of its wide temperature range, accuracy, and stability. RTDs may be used in certain designs of PCBs and control systems. In the embodiments disclosed herein, screw 425 represents a junction between a thermocouple and RTD. Similarly, screw 430 represents a junction between a thermocouple and RTD.

In the presently disclosed embodiments an algorithm selected from a category of algorithms is developed. The algorithm accepts as arguments on board PCB temperature history readings to calculate an estimation of the actual temperature on junctions (or screws) 425 and 430 of, for example, cold junction 420.

Parameters used in the algorithm are determined via a regression analysis conducted in an offline phase, after which the design of the algorithm is fixed and deployed in firmware associated with a system controller or other such device. In the online phase, the algorithm deployed in the firmware of the controller uses current and historic temperature readings taken onboard a PCB associated with the controller to calculate an estimation of the actual temperature of the cold junction.

The embodiments disclosed herein do not require physical closure or any other physical change to the cold junction. However, such closures may be provided if desired.

Figure 5:
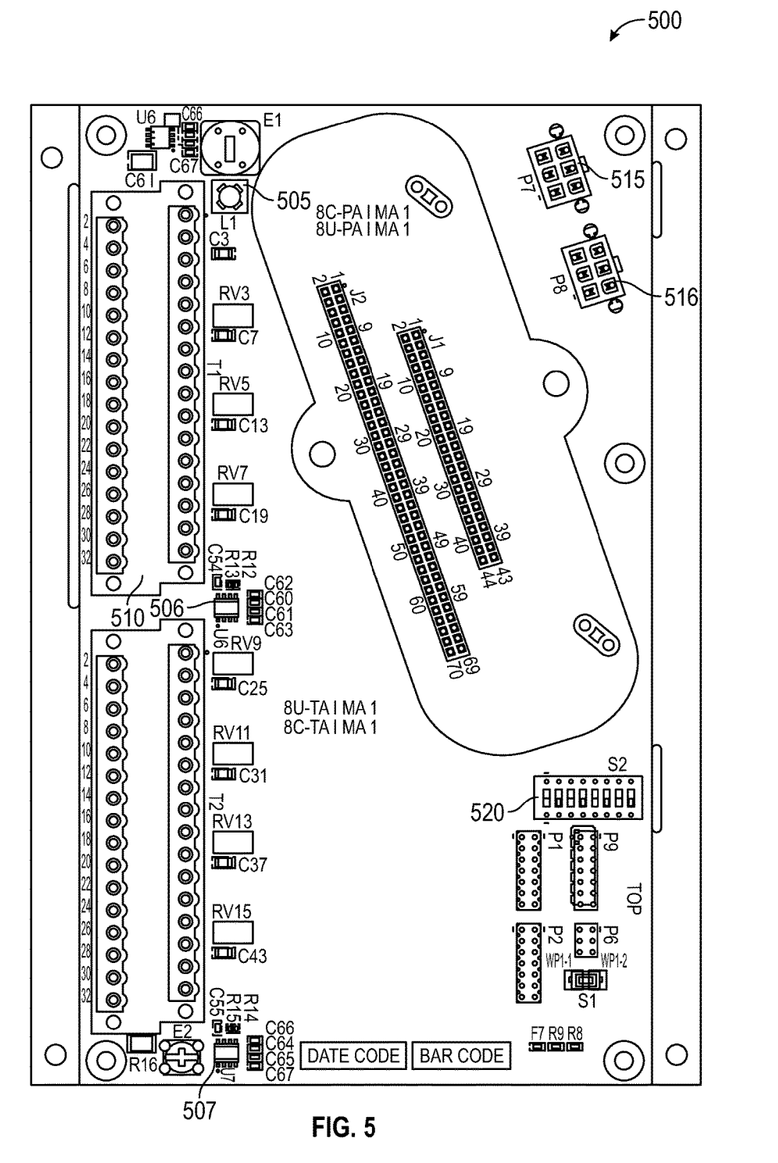
FIG. 5 depicts a diagram of a printed circuit board in accordance with the disclosed embodiments.

FIG. 5 illustrates a PCB 500 in accordance with embodiments of the present invention. This PCB 500 may be deployed in a system controller, signal interface device, or other such device. The PCB 500 includes temperature sensors 505, 506 and 507. The PCB also includes a channel component 510 that provides a plurality of channels. In a preferred embodiment the number of channels may be 1 to 16 channels, however different numbers of channels may be required in different applications. The PCB provides two combination cable connectors 515 and 516 which provide 24 DC communications, and a DIP switch 520. It should be appreciated that the PCB 500 illustrated in FIG. 5 is exemplary. The present embodiments may be used with any number of PCB configurations depending on the associated controller/signal interface device and the specific application. PCB 500 can include a cold junction between a TC and RTD as illustrated in FIG. 4.

The methods and systems described herein include an initialization or offline procedure for identifying an optimal algorithm and regressing parameters for firmware to calculate a cold junction temperature. The methods and systems also include an online implementation of algorithm in firmware on a PCB in a control system application, or in other such applications, wherein the firmware is used to calculate the cold junction temperature for cold junction compensation during the deployment of the PCB and control system.

Figure 6:
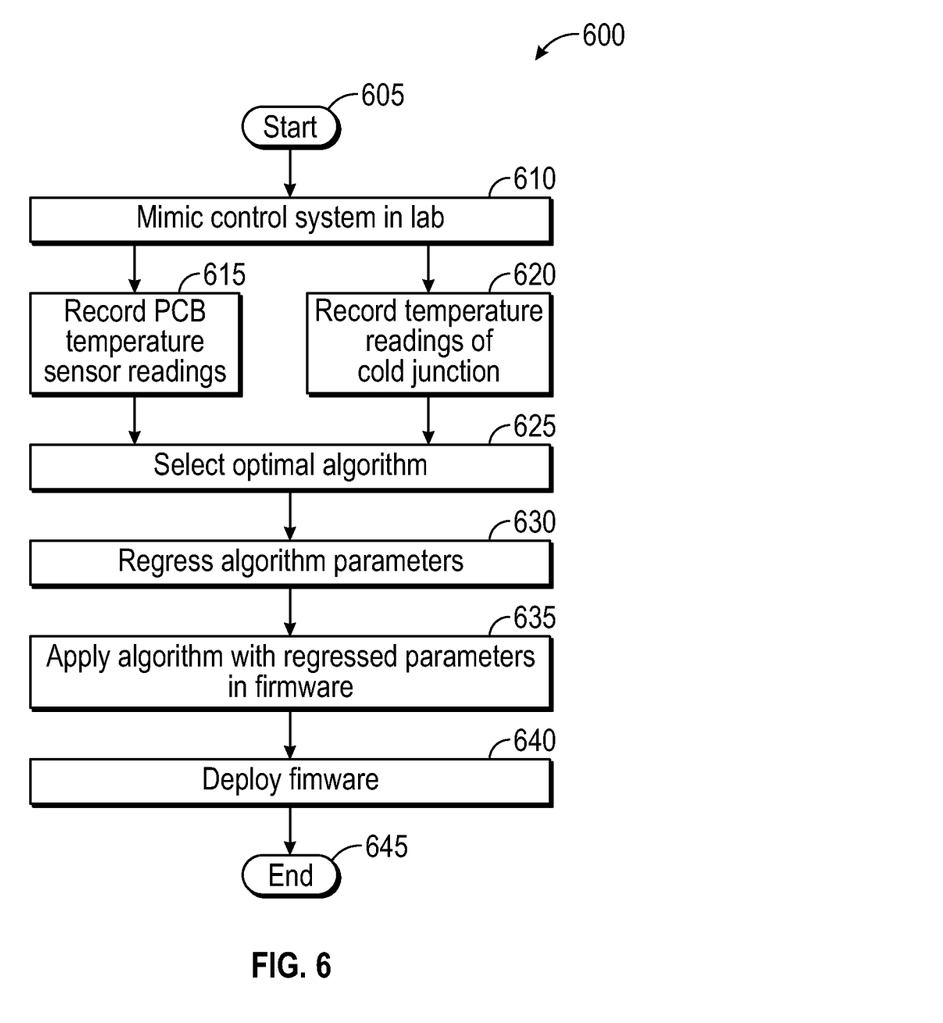
FIG. 6 depicts a flow chart of logical operational steps associated with a method for offline selection of an algorithm in accordance with the disclosed embodiments.

FIG. 6 illustrates a method 600 illustrating logical operational offline steps for identifying an optimal algorithm and regressing parameters for implementation in firmware, said firmware being used to calculate an estimated cold junction temperature for cold junction compensation. The method begins at 605.

At step 610 a control system, including but not limited to, a PCB such as PCB 500, with a TC/RTD junction can be configured. The lab setting is configured to mimic the operational conditions that the control system will experience during deployment. This may include for example, exposure to hot or cold temperatures, fluctuating temperatures, wind, humidity and humidity changes, etc. For example, intentional environmental temperature changes can be initiated in the lab setting.

With the lab setting configured to mimic operational conditions, the control system can be run. The on PCB temperature readings provided by the on PCB temperature sensor or sensor(s) can be recorded as shown at block 615. It should be appreciated that many such measurements can be taken and recorded. These readings are known as "t_sensor."

Simultaneously, a standalone temperature sensor can be used to record the actual cold junction screw temperature as illustrated at 620. Again many of these readings can be taken, preferably in temporal coordination with the PCB temperature readings taken at 615. The cold junction screw temperature readings are known as "t_screw."

At step 625 an algorithm can be selected from a category of algorithms which estimate the current cold junction temperature t_screw(n) as a function of the present PCB onboard temperature reading t_sensor(n), the past PCB onboard temperature readings t_sensor(history), and the past cold junction temperature t_screw(history). This category of algorithms can be expressed mathematically as:

$$t\_screw(n)=f(t\_sensor(n),t\_sensor(history),t\_screw(history)) \quad (1)$$

where n is an integer representing the present and total number of readings taken. The category of algorithms defined by equation 1 provides a current estimate t_screw of the cold junction temperature using the current onboard temperature sensor reading t_sensor and a collection of past readings of t_sensor and t_screw. This is an iterative class of equations calculated in accordance with scan rate for the signal sampling from the respective temperature sensors.

The parameters in the candidate algorithms defined by equation 1 are regressed with the data sequence from t_sensor and t_screw so that the difference between the measured temperature of t_screw and a calculated temperature t_screw according to the algorithm is minimized, as shown at 630. After the parameters are regressed the algorithm with the smallest difference between the calculated values of t_screw and the measured values of t_screw can be implemented in the firmware of the control system as illustrated at 635.

At this stage the control system with the selected algorithm implemented in firmware is ready for deployment at 640, and the offline method ends at 645.

Figure 7:
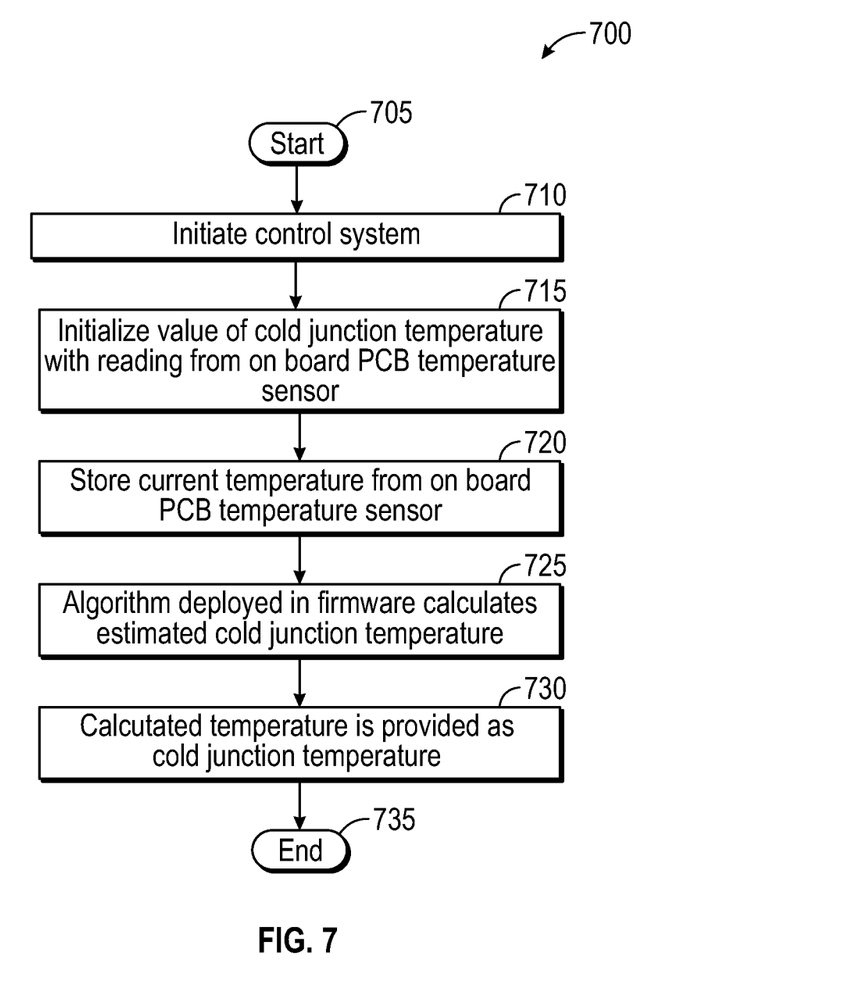
FIG. 7 depicts a flow chart of logical operational steps associated with a method for online determination of a cold junction temperature for cold junction compensation in accordance with the disclosed embodiments.

FIG. 7 illustrates a method 700 for determining the cold screw temperature of a cold screw junction for cold junction compensation in a deployed control system in accordance with embodiments of the invention. The online method 700 begins at 705.

It should be understood that the steps illustrated in method 700 are contingent on the completion of the offline steps for selecting an optimal algorithm as illustrated in method 600. At 710 the control system can be installed, initiated, and deployed. Once the control system is running a temperature reading from the onboard PCB temperature sensor can be taken and used as an initial value for the temperature of the cold junction t_screw(n) as shown at block 715.

Once the algorithm implemented in firmware has been initialized, at 720 temperature readings from the onboard PCB temperature sensor can be collected and stored in onboard storage. The algorithm deployed in the firmware is provided the current temperature from the onboard PCB temperature sensor t_sensor(n), along with past temperature sensor reading(s) t_sensor(history), and the past calculated screw temperature(s) t_screw(history). Using this data the algorithm calculates an estimated current cold junction temperature t_screw(n) as shown at 725.

The calculated t_screw(n) is then passed to the storage for future use as a value of t_screw(history) and then provided to the control system as the estimated cold junction temperature. The value t_screw(n) is thus used as the cold junction temperature for cold junction compensation as illustrated at 730.

It should be understood that the current estimated value of the cold junction temperature t_screw(n) is updated frequently by iterating through steps 720, 725, and 730. The iteration continues until the control system is no longer in use at which point the method ends at 735.

Figure 8:
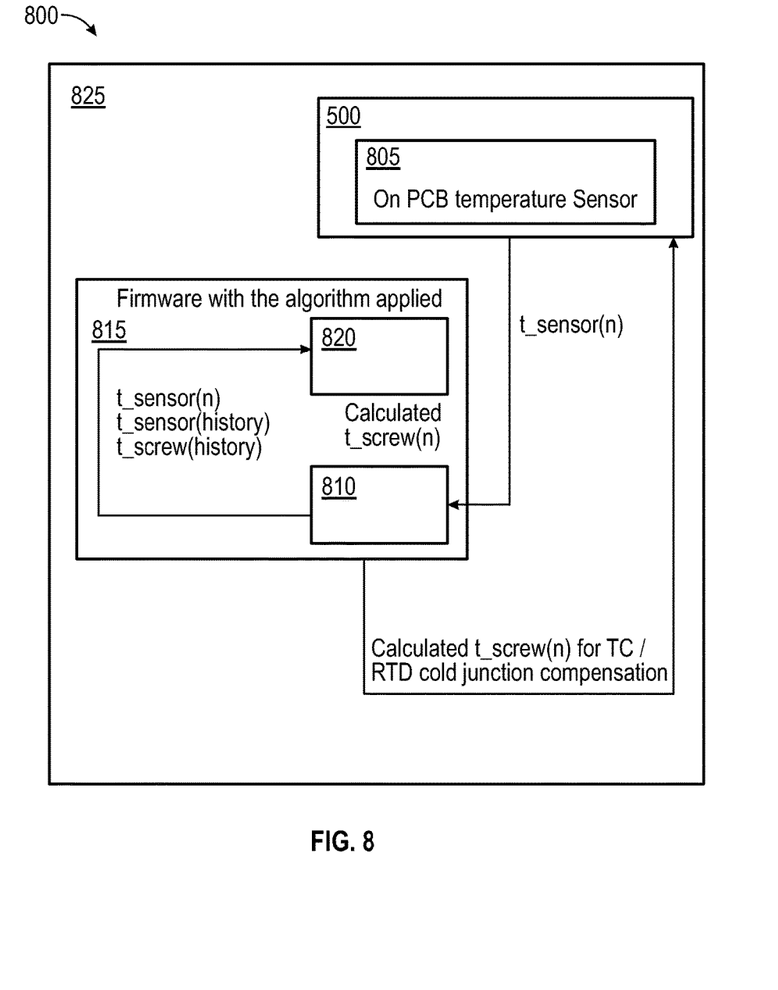
FIG. 8 depicts a block diagram of a system for cold junction compensation in accordance with the disclosed embodiments.

FIG. 8 illustrates a block diagram 800 of a system for calculating cold junction temperature for cold junction compensation of the junction between a thermocouple and RTD in accordance with the embodiments disclosed herein. A control system 800 includes a PCB 500 with an on board PCB temperature sensor 805. The control system may be implemented as hardware or software implemented using a computer system such as computer system 100.

The onboard PCB temperature sensor 805 can be used to collect a current temperature t_sensor(n). That temperature from the onboard PCB temperature sensor 805 is provided to storage 810 included in the firmware 815. The Algorithm 820, determined in the offline stage illustrated in FIG. 6, is also built into firmware 815. Note that algorithm 820 will vary according to the offline stage results and the specific application.

Storage 810 can be provided data indicative of the current onboard PCB temperature t_sensor(n). Storage 810 also stores previous readings from the onboard PCB temperature sensor t_sensor(history), as well as current calculated cold junction screw temperatures t_screw(n), and previously calculated cold junction screw temperatures t_screw(history). The stored t_sensor(n), t_sensor(history), and t_screw(history) can be provided to the algorithm 820, which uses that data to calculate a current cold junction screw temperature t_screw(n), which, as noted above, is stored in storage 810.

The calculated current cold junction screw temperature t_screw(n) can then be provided for use as the current cold junction screw temperature for use in cold junction compensation. It should be appreciated that, the nature of this system and its implementation is iterative. Thus, as newly calculated temperatures t_screw(n) and newly measured onboard PCB temperature sensor readings t_sensor(n) are provided to storage 810, previously calculated cold junction temperatures and onboard PCB temperature sensor readings are then stored as one of many values of t_screw(history) and t_sensor(history) respectively.

The methods and systems described herein regress the parameters associated with a category of algorithms during in lab experiment, after design of a control system is fixed in an offline stage to select an optimal algorithm for calculating an estimated cold junction temperature. The algorithm is then provided in firmware associated with the control system, and uses on board PCB temperature history readings to estimate actual temperature on screws of the TC/RTD cold junction in the control system. It is possible to apply different set of parameters for different channels on a PCB associated with the control system to thereby improve performance on each individual channel. Meanwhile, although physical closure is not necessary, a low cost physical closure of the TC/RTD junction can produce even more accurate temperature estimation.

Based on the foregoing, it can be appreciated that a number of embodiments, preferred and alternative, are disclosed herein. For example, in one embodiment, a method determining temperature comprises an offline phase comprising: determining an applicable algorithm for calculating a cold junction screw temperature; and deploying the applicable algorithm in firmware; and an online phase comprising: providing at least one measured temperature to the applicable algorithm deployed in firmware; calculating a temperature of a cold junction screw according to the applicable algorithm deployed in firmware; and assigning the calculated temperature of the cold junction screw as a cold junction temperature.

In another embodiment determining an applicable algorithm further comprises mimicking an on site environment that will be experienced in the online phase; collecting at least one temperature sensor reading; collecting at least one cold junction screw temperature reading; regressing the parameters in at least one algorithm according to the collected temperature sensor readings and the cold junction screw temperature readings; and calculating at least one cold junction screw temperature according to the at least one algorithm with the regressed parameters. Determining the applicable algorithm further comprises selecting an algorithm wherein a difference between the at least one calculated cold junction screw temperature reading and the at least one collected cold junction screw temperature reading is minimized.

In another embodiment the cold junction screw comprises a screw associated with the cold junction on a printed circuit board.

In yet another embodiment the online phase further comprises initializing the cold junction screw temperature with a measured temperature reading. The measured temperature reading is taken from a temperature sensor associated with the printed circuit board. The printed circuit board is a component in a control system.

In another embodiment a system for determining temperature comprises a cold junction screw; firmware configured to calculate a current temperature of the cold junction screw; a temperature sensor configured to provide a measured temperature; and a memory module for storing the current calculated temperature of the cold junction screw, at least one previously calculated temperature of the cold junction screw, the current measured temperature from the temperature sensor, and at least one previously measured temperature from the temperature sensor wherein an algorithm configured in the firmware provides the current temperature of the cold junction screw according to the at least one previous calculated temperature of the cold junction screw, the current measured temperature from the temperature sensor, and at least one previously measured temperature from the temperature sensor.

In an embodiment the firmware configured to calculate a cold junction screw temperature further comprises an algorithm selected from a category of algorithms in an offline phase; and a plurality of parameters associated with the algorithm.

In another embodiment of the system the offline phase comprises mimicking an on site environment that will be experienced by the cold junction screw; collecting at least one temperature sensor reading; collecting at least one cold junction screw temperature reading; regressing the parameters in at least one algorithm according to the collected temperature sensor readings and the cold junction screw temperature readings; calculating at least one cold junction screw temperature according to the at least one algorithm with the regressed parameters; and determining the algorithm configured in the firmware.

In an embodiment of the system determining the algorithm configured in the firmware further comprises selecting an algorithm wherein a difference between the at least one calculated cold junction screw temperature reading and the at least one collected cold junction screw temperature reading is minimized. The cold junction screw comprises a screw associated with a cold junction between a thermocouple and resistance temperature detector on a printed circuit board. The temperature sensor provides an initial temperature for use as an initial cold junction screw temperature. The printed circuit board is a component in a control system.

In another embodiment a method for determining temperature comprises an offline phase comprising mimicking an onsite environment that will be experienced in an online phase; collecting at least one temperature sensor reading; collecting at least one cold junction screw temperature reading; regressing at least one parameter associated with at least one algorithm according to the collected temperature sensor readings and the cold junction screw temperature readings; calculating at least one cold junction screw temperature according to the at least one algorithm with the regressed parameters; and selecting one of the at least one algorithms wherein a difference between the at least one calculated cold junction screw temperature reading and the at least one collected cold junction screw temperature reading is minimized; and an online phase comprising providing at least one measured temperature to the selected algorithm; calculating a temperature of a cold junction screw according to the applicable algorithm deployed in firmware; and assigning the calculated temperature of the cold junction screw as a cold junction temperature. In another embodiment the method comprises deploying the selected algorithm in firmware.

In another embodiment the cold junction screw comprises a screw associated with the cold junction on a printed circuit board.

In another embodiment the online phase further comprises initializing the cold junction screw temperature with a measured temperature reading. The measured temperature reading is taken from a temperature sensor associated with the printed circuit board. The printed circuit board is a component in a control system.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for determining temperature comprising:
a cold junction screw;
firmware configured to calculate a current temperature of said cold junction screw;
a temperature sensor configured to provide a measured temperature; and
a memory module for storing said current temperature of said cold junction screw, at least one previously calculated temperature of said cold junction screw, said measured temperature from said temperature sensor, and at least one previously measured temperature from said temperature sensor;
wherein an algorithm configured in said firmware provides said current temperature of said cold junction screw according to said at least one previous calculated temperature of said cold junction screw, said measured temperature from said temperature sensor, and said at least one previously measured temperature from said temperature sensor.

2. The system of claim 1, wherein said firmware configured to calculate said current temperature of said cold junction screw further comprises:
said algorithm selected from a category of algorithms in an offline phase; and
a plurality of parameters associated with said algorithm.

3. The system of claim 2, wherein said offline phase comprises:
mimicking an on site environment that will be experienced by said cold junction screw;
collecting said measured temperature from said temperature sensor;
collecting at least one cold junction screw temperature reading from a standalone temperature sensor;
regressing said parameters in said algorithm according to said collected temperature sensor readings and said cold junction screw temperature readings;
calculating said at least one cold junction screw temperature according to said algorithm with said regressed parameters; and
determining said algorithm configured in said firmware.

4. The system of claim 3, wherein determining said algorithm configured in said firmware further comprises:
selecting an algorithm wherein a difference between said calculated at least one cold junction screw temperature reading and said collected at least one cold junction screw temperature reading is minimized.

5. The system of claim 1, wherein said cold junction screw comprises a screw associated with a cold junction between a thermocouple and resistance temperature detector on a printed circuit board.

6. The system of claim 5, wherein said temperature sensor provides an initial temperature for use as an initial cold junction screw temperature.

7. The system of claim 5, wherein said printed circuit board is a component in a control system.

* * * * *